US012597719B2

(12) United States Patent
Panitz et al.

(10) Patent No.: US 12,597,719 B2
(45) Date of Patent: Apr. 7, 2026

(54) CONNECTION ARRANGEMENT FOR FASTENING AN ELECTRICAL CONTACT ELEMENT TO AN ELECTRICAL CONDUCTOR

(71) Applicant: TE Connectivity Germany GmbH, Bensheim (DE)

(72) Inventors: Gregor Panitz, Bensheim (DE); Holger Starke, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 341 days.

(21) Appl. No.: 17/961,699

(22) Filed: Oct. 7, 2022

(65) Prior Publication Data

US 2023/0114900 A1 Apr. 13, 2023

(30) Foreign Application Priority Data

Oct. 8, 2021 (DE) ........................ 102021126207.0

(51) Int. Cl.

*H01R 4/50* (2006.01)
*H01R 4/56* (2006.01)
*H01R 4/60* (2006.01)
*H01R 13/74* (2006.01)

(52) U.S. Cl.

CPC ................. *H01R 4/50* (2013.01); *H01R 4/56* (2013.01); *H01R 4/60* (2013.01); *H01R 13/748* (2013.01)

(58) Field of Classification Search

CPC ...... H01R 4/48; H01R 13/748; H01R 43/048; H01R 11/28–289; H01R 4/50–60
USPC ........................................................ 439/801
See application file for complete search history.

(56) References Cited

U.S. PATENT DOCUMENTS

| | | | | |
|---|---|---|---|---|
| 1,770,748 | A | 7/1930 | Dawson et al. | |
| 2,279,508 | A * | 4/1942 | Bergan | H01R 4/5025 439/805 |
| 4,141,619 | A | 2/1979 | DeLuca | |
| 5,418,331 | A | 5/1995 | Delalle | |
| 5,573,423 | A * | 11/1996 | Lin | H01R 11/281 439/805 |
| 2003/0054702 | A1 | 3/2003 | Ferderer | |

(Continued)

FOREIGN PATENT DOCUMENTS

| | | | |
|---|---|---|---|
| CN | 106450816 | A | 2/2017 |
| DE | 1078204 | B | 3/1960 |

(Continued)

OTHER PUBLICATIONS

Korean Office Action dated May 21, 2024 with English translation, corresponding to Application No. 10-2022-0128690, 14 pages.

(Continued)

*Primary Examiner* — Christopher M Koehler
*Assistant Examiner* — Gregory L Mangot
(74) *Attorney, Agent, or Firm* — Barley Snyder

(57) ABSTRACT

A connection arrangement includes an expansion ferrule insertable in a slidable manner into a central opening of an electrical contact element and an expansion element inserted into the expansion ferrule. The expansion ferrule is expanded when the expansion element is fully inserted into the expansion ferrule to clamp the electrical contact element and fasten the electrical contact element to an electrical conductor.

19 Claims, 5 Drawing Sheets

(56) References Cited

U.S. PATENT DOCUMENTS

| | | | | |
|---|---|---|---|---|
| 2015/0244134 | A1* | 8/2015 | Cumant ............ | H01R 13/5045 439/810 |
| 2016/0261066 | A1 | 9/2016 | Muller | |
| 2017/0054227 | A1 | 2/2017 | Cumant | |
| 2018/0076568 | A1 | 3/2018 | Thomas et al. | |

FOREIGN PATENT DOCUMENTS

| | | | |
|---|---|---|---|
| DE | 69215685 | T2 | 7/1997 |
| DE | 20102063 | U1 | 6/2001 |
| DE | 102005054849 | A1 | 5/2007 |
| EP | 1376766 | A1 | 1/2004 |
| GB | 285379 | A | 5/1929 |
| GB | 2383105 | A | 6/2003 |
| JP | 2009516340 | A | 4/2009 |
| WO | 2007057323 | A1 | 5/2007 |

OTHER PUBLICATIONS

German's Office Action, Application No. 102021126207.0, Dated: May 31, 2022, 6 pages.

Search Report from the European Patent Office dated Feb. 20, 2023, corresponding to Application No. 22200025.9-1201, 8 pages.

European Patent Office Examination Report dated Jun. 6, 2025, corresponding to Application No. 22 200 025.9-1201, 8 pages.

Chinese Office Action dated Nov. 26, 2025 with English translation, corresponding to Application No. 202211195160.7, 14 pages.

* cited by examiner

CONNECTION ARRANGEMENT FOR FASTENING AN ELECTRICAL CONTACT ELEMENT TO AN ELECTRICAL CONDUCTOR

CROSS-REFERENCE TO RELATED APPLICATION

This application claims the benefit of the filing date under 35 U.S.C. § 119(a)-(d) of German Patent Application No. 102021126207.0, filed on Oct. 8, 2021.

FIELD OF THE INVENTION

The invention relates to a connection arrangement for fastening and, in particular, electrically contacting an electrical contact element to an electrical conductor, in particular to a conductor rail.

BACKGROUND

The fastening and electrical contacting of electrical contact elements on electrical conductors, in particular on conductor rails, in certain circumstances can be technically complex. For instance, due to limited available installation space or fixed specifications for the position of the electrical conductor relative to the electrical contact element, conditions may arise making it difficult to fasten the electrical contact element to the electrical conductor.

The fastening may be further complicated in that, during the assembly, the position of the electrical conductor relative to the electrical contact element may deviate from the predetermined position. It must therefore be possible to compensate for position tolerances. This problem is usually solved by connection arrangements in which, at least in sections, elastic electrical conductors or contact elements are used. Such a solution, however, involves technical effort and is thus expensive.

SUMMARY

A connection arrangement includes an expansion ferrule insertable in a slidable manner into a central opening of an electrical contact element and an expansion element inserted into the expansion ferrule. The expansion ferrule is expanded when the expansion element is fully inserted into the expansion ferrule to clamp the electrical contact element and fasten the electrical contact element to an electrical conductor.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
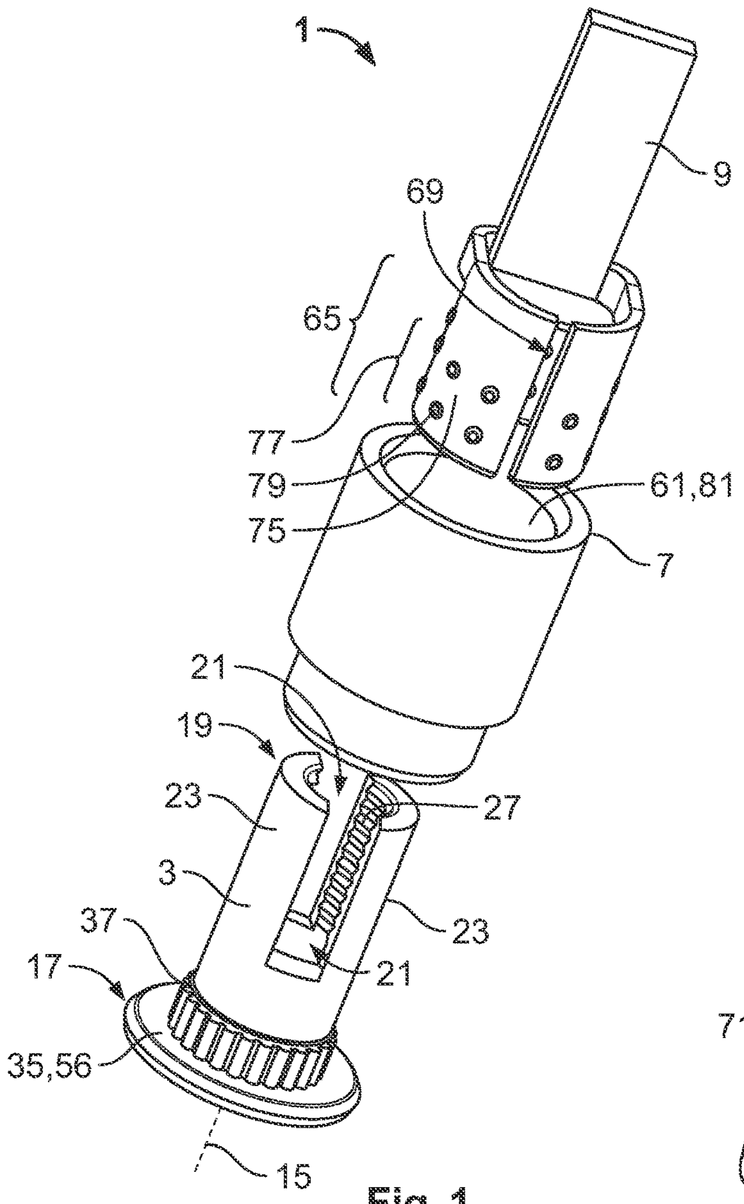
FIG. 1 is an exploded perspective view of a connection arrangement according to an embodiment.

Below, the invention is explained in more detail using exemplary embodiments with reference to the drawings. The combination of features shown in the embodiments can be supplemented by further features, depending on the properties of the connection arrangement according to the invention that are necessary for a specific application. Moreover, individual features can be omitted from the embodiment described if the effect of this feature is not important in a specific application. In the drawings, the same reference signs are used for elements with the same function and/or the same structure.

An embodiment of a connection arrangement 1 according to the invention will be described with reference to FIGS. 1 to 4. The connection arrangement 1 of the first embodiment has an expansion ferrule 3 and an expansion element 5 that can be inserted into the expansion ferrule.

In the shown embodiment, but not necessarily, a clamping contact ferrule 7 is also part of the connection arrangement 1. Furthermore, an electrical contact element 9 and/or an electrical conductor 11 may also be part of the connection arrangement 1. Usually, however, the connection arrangement 1 and the electrical contact element 9 will be distributed as separate items. The electrical contact element 9 can, for example, be part of a plug that is distributed separately but is configured for connection to the connection arrangement 1.

Only by way of example, the electrical conductor 11 is shown as a conductor rail 13 in the figures. The connection arrangement 1 is used for mechanical fastening and, in an embodiment, also for establishing an electrically conductive connection between the electrical contact element 9 and the electrical conductor 11.

The expansion ferrule 3 has an overall elongated hollow cylindrical shape and extends along a longitudinal axis 15. Along the longitudinal axis 15, the expansion ferrule 3 has a conductor-side end 17 and a contact-side end 19, as shown in FIG. 1.

At the contact-side end 19, the expansion ferrule 3 has two longitudinal slots 21. The two longitudinal slots 21 extend from the contact-side end 19 parallel to the longitudinal axis 15 into the expansion ferrule 3, so that the expansion ferrule 3 is open in the radial direction and towards the contact-side end 19 through the longitudinal slots 21. Two contact-pressure elements 23 are formed by the two longitudinal slots 21, which can be deflected away from each other in the radial direction.

Figure 3:
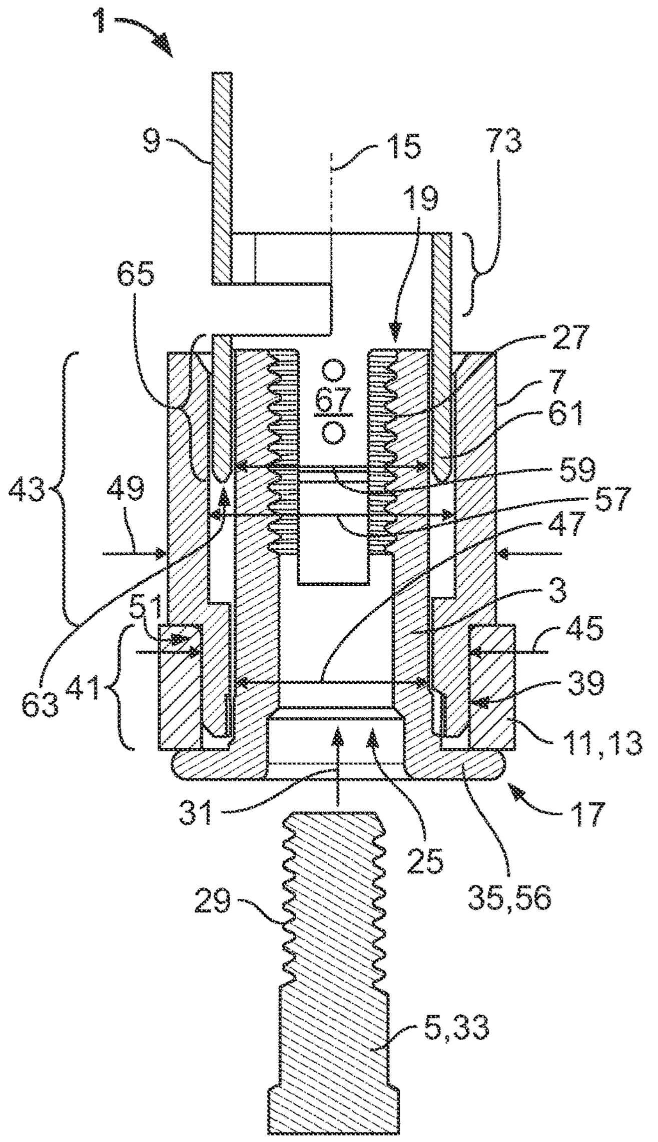
FIG. 3 is a sectional side view of the connection arrangement of FIG. 1.
Figure 4:
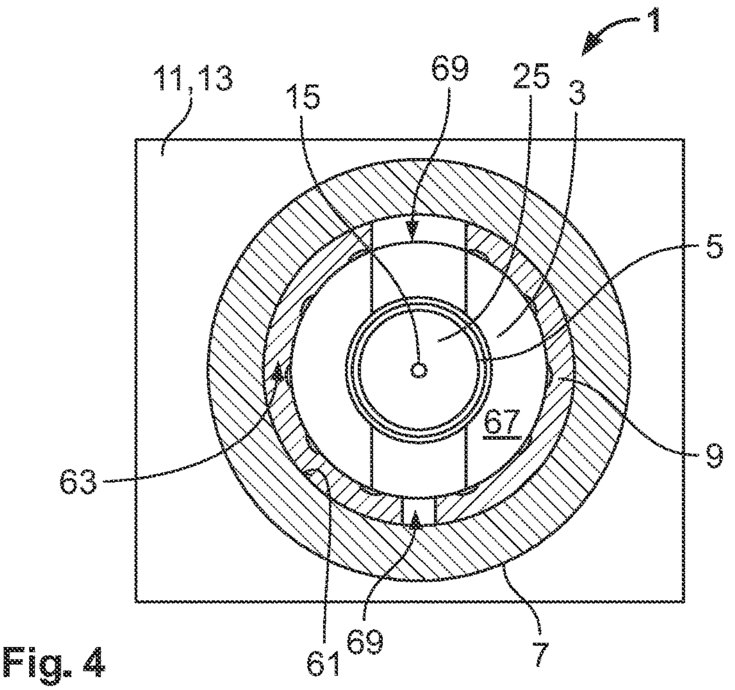
FIG. 4 is a sectional top view of the connection arrangement of FIG. 1.

Inside the expansion ferrule 3, there is an expansion element receptacle 25 for receiving the expansion element 5, as shown in FIGS. 3 and 4. In the expansion element receptacle 25, there is provided the expansion ferrule 3 with an internal thread 27. The expansion element 5 is accordingly provided with a complementary external thread 29.

The expansion element 5 can be inserted along an insertion direction 31 into the expansion ferrule 3, or its expansion element receptacle 25. The insertion direction 31 extends parallel to the longitudinal axis 15 from the conductor-side end 17 toward the contact-side end 19. If the expansion element 5, which can be configured as a screw 33, is inserted into the expansion ferrule 3 and actuated in such a way that the two threads 27 and 29 interact, the two contact-pressure elements 23 can be moved away from each other. In other words, screwing in the screw 33 can cause the expansion ferrule 3 to expand.

An inner diameter of the internal thread 27 can taper along the insertion direction 31 of the expansion element 5. As an alternative, the outer diameter of the external thread 29 on the expansion element 5 can increase counter to the insertion direction 31. It is also possible for the internal thread 27 to be tapered and the external thread 29 to be enlarged.

In order to increase the expansion of the expansion ferrule 3, the expansion element receptacle 25 can taper along the insertion direction 31. Alternatively, or additionally, the expansion element 5 can spread against the insertion direction 31, at least in the area of the external thread 29, and may be of conical shape or wedge shape.

As an alternative to an embodiment comprising threads, it is also possible for the expansion element 5 and the expansion element receptacle 25 each to have an oval or another cross-section, wherein a rotation of the expansion element 5 within the expansion element receptacle 25 results in expansion of the expansion ferrule 3.

At its conductor-side end 17, the expansion ferrule 3 is provided with a flange 35, as shown in FIGS. 1 and 3. The flange 35 may abut the electrical conductor 11 to define the position of the expansion ferrule 3 with respect to the electrical conductor 11.

In addition, the expansion ferrule 3 may be provided with a knurling 37 in an area adjacent to the flange 35, through which the expansion ferrule 3 can be pressed against the clamping contact ferrule 7. In addition to mechanical fastening to the clamping contact ferrule 7, the knurling 37 may also serve to prevent rotation of the expansion ferrule 3 when the expansion element 5 is rotated. In an alternative embodiment without a clamping contact ferrule 7, the knurling 37 may also interact with an inner wall of a through hole 39 in the electrical conductor 11.

The clamping contact ferrule 7 has an overall hollow cylindrical shape. The clamping contact ferrule 7 is so configured that when the expansion ferrule 3 is inserted into the clamping contact ferrule 7, it is arranged coaxially with the expansion ferrule 3.

The clamping contact ferrule 7 has a conductor portion 41 and a contacting portion 43 that adjoin each other along the longitudinal axis 15, as shown in FIG. 3. In the fitted-together state, the longitudinal axis of the clamping contact ferrule 7 corresponds to the longitudinal axis 15 of the expansion ferrule 3.

The conductor portion 41 is used for connection to the electrical conductor 11, in particular to the conductor rail 13. An outer diameter 45 of the clamping contact ferrule 7 in the conductor portion 41 is dimensioned so that the conductor portion 41 can be inserted into the through hole 39 of the conductor 11, forming a press-fit in an embodiment.

An inner diameter 47 of the clamping contact ferrule 7 in the conductor portion 41 may be dimensioned in such a way that the expansion ferrule 3 can be received in this portion in a fitted manner. In particular, the expansion ferrule 3 can be inserted in the conductor portion 41 to form a press-fit in the clamping contact ferrule 7.

If the expansion ferrule 3 has a knurling 37, the expansion ferrule 3 forms a positive and/or frictional connection with the clamping contact ferrule 7 at least in the region of the knurling 37.

In the contacting portion 43, the clamping contact ferrule 7 may have an outer diameter 49 that is larger than the outer diameter 45 in the conductor portion 41, as shown in FIG. 3. A step 51 may be formed between the two portions 41 and 43 due to the different sized outer diameters 45 and 49. The step 51 may be used to define the position of the clamping contact ferrule 7 with respect to the conductor 11. In other words, the clamping contact ferrule 7 can be inserted from a first side 53 of the conductor 11 into the through hole 39 until it abuts the conductor 11 with the step 51, or with the contacting portion 43 on the first side 53.

Figure 2:
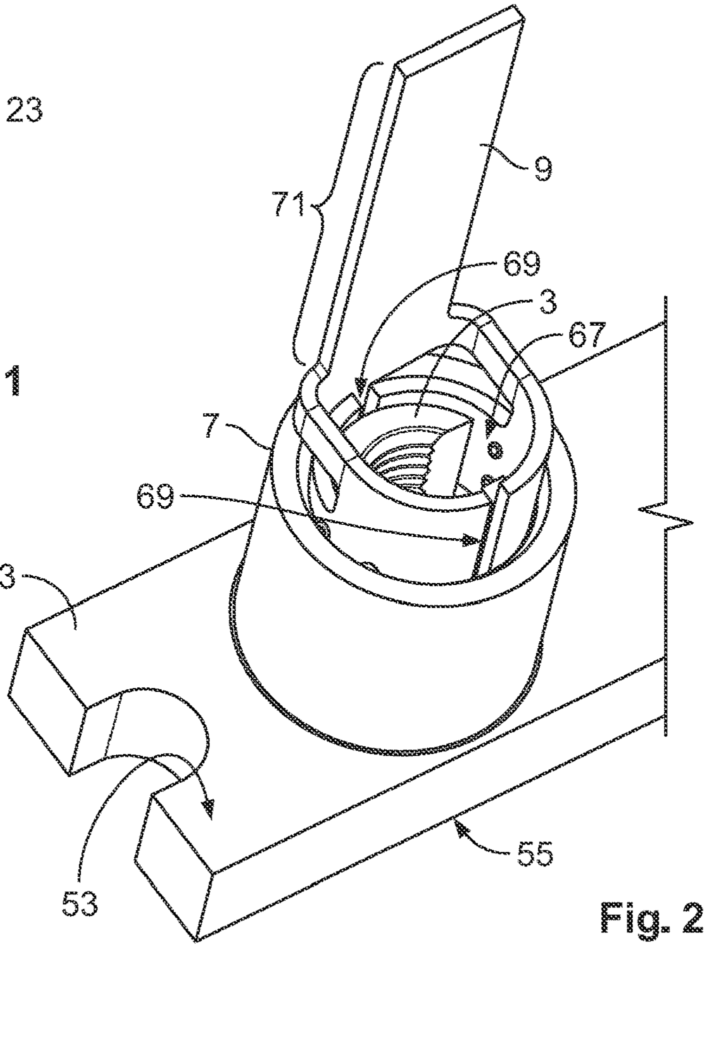
FIG. 2 is a perspective view of the connection arrangement of FIG. 1.

Accordingly, the expansion ferrule 3 can be inserted from the second side 55, shown in FIG. 2, opposite the first side 53 into the through hole 39 or into the clamping contact ferrule 7 until the flange 35 rests against the second side 55 of the conductor. The flange 35 represents a stop 56 of the expansion ferrule 3.

In the contacting portion 43, the clamping contact ferrule 7 has an inner diameter 57 that is larger than the inner diameter 47 in the conductor portion 41, as shown in FIG. 3. In other words, the inner diameter 57 is larger than an outer diameter 59 of the expansion ferrule 3, at least in a state in which the expansion ferrule 3 is not yet expanded.

Due to the fact that the inner diameter 57 of the clamping contact ferrule 7 in the contacting portion 43 is larger than the outer diameter 59 of the expansion ferrule 3, a contact receptacle 63 for slidably receiving the electrical contact element 9, which is accessible from the outside, is formed between the expansion ferrule 3 and an inner wall 61 of the clamping contact ferrule 7, at least in the contacting portion 43. In an embodiment, the contact receptacle 63 has an annular cross-section, or a hollow cylindrical shape.

When the expansion ferrule 3 is expanded, it is spread towards the inner wall 61. In other words, the two contact-pressure elements 23 move away from each other. The cross-section of the contact receptacle 63 is thus reduced. With the contact element 9 inserted in the contact receptacle 63, the contact element 9 is consequently clamped between the expansion ferrule 3 and the inner wall 61 of the clamping contact ferrule 7.

The electrical contact element 9 has a contacting portion 65, shown in FIGS. 1 and 3, with which it can be inserted into the clamping contact ferrule 7, in particular into the contact receptacle 63. At least in the contacting portion 65, the contact element 9 may be hollow-cylindrical in shape so that it is formed complementary to the contact receptacle 63. The hollow cylindrical shape surrounds a central opening 67 of the contact element 9. The expansion ferrule 3 can be inserted into the central opening 67 of the electrical contact element 9. In principle, this is also possible without a clamping contact ferrule 7.

In an embodiment, the contacting portion 65 is substantially formed hollow cylindrical. The central opening of the electrical contact element 9 is located in the hollow cylinder shape. In the fitted-together state of the connection arrangement, the contacting portion 65, along a circumferential direction, may cover more than half of the hollow cylindrical receptacle. This allows the largest possible contact area to be achieved between the contacting portion 65 and the rest of the connection arrangement 1. A large contact area is advantageous in order to achieve both mechanical stability of the connection and good electrical conduction between the electrical contact element 9 and the rest of the connection arrangement 1.

When the electrical contact element 9 is inserted with its contacting portion 65 into the contact receptacle 63, it is disposed between the expansion ferrule 3 and the inner wall 61 of the clamping contact ferrule 7, as seen in a radial direction. As long as the expansion element 5 is not yet fully inserted into the expansion ferrule 3, the contact element 9 can be moved along the longitudinal axis 15. The contact element 9 is not clamped until the expansion ferrule 3 is expanded. The electrical contact element 9 can be disposed relative to the expansion ferrule 3 in such a way that the expansion ferrule 3 is inserted in the contact element 9 in a sliding manner, in particular in an axially sliding manner.

In an embodiment with a clamping contact ferrule 7, the contact element 9 is also provided with a longitudinal slot 69, shown in FIG. 1, so that the contact element 9 can also be spread open to follow the movement of the expansion ferrule 3 and to be pressed against the inner wall 61. In an embodiment, the contact element 9 is provided with two longitudinal slots 69. The two longitudinal slots 69 are diametrically opposed across the central opening 67.

The electrical contact element 9 may have a connection portion 71, shown in FIG. 2, in that it may have any shape suitable for accommodating and/or electrically contacting the contact element 9 in, for example, a plug or another component. Between the connection portion 71 and the contacting portion 65, there may be a transition portion 73 in which the shape of the contact element 9 in the connection portion 71 merges into the shape of the contact element 9 in the contacting portion 65.

As shown in FIG. 1, the electrical contact element 9 has a friction structure 77 in its contacting portion 65, at least on its outer surface 75. The friction structure 77 can be obtained by a structuring deviating from a smooth surface. In particular, the friction structure 77 can have contact protrusions, ribs, points, knurlings or a roughened surface. In the shown embodiment, the friction structure 77 is formed by a plurality of outwardly facing projections 79. The projections 79 can form defined contact points for contacting the inner wall 61 of the clamping contact ferrule 7 when the expansion ferrule 3 is spread open and the contact element 9 is pressed against the inner wall 61. Alternatively or additionally, the surface 81 of the inner wall 61 may be provided with a friction structure 77.

The sliding arrangement allows positional tolerances between the electrical conductor 11 and the electrical contact element 9 to be compensated. Once the electrical contact element 9 and the expansion ferrule 3 are positioned relative to each other in the desired manner, the expansion element 5 can be inserted into the expansion ferrule 3. Thus, the expansion ferrule 3 is expanded and creates pressure against the electrical contact element 9. This allows the electrical contact element to be mechanically fixed to the expansion ferrule 3. At the same time, through the contact between the expansion ferrule 3 and the electrical contact element 9, an electrically conductive connection is established between these two parts.

A second embodiment of a connection arrangement 1 according to the invention will be described with reference to FIGS. 5 to 7. For the sake of brevity, there are discussed only the differences from the embodiment formerly described with reference to FIGS. 1 to 4.

Figure 5:
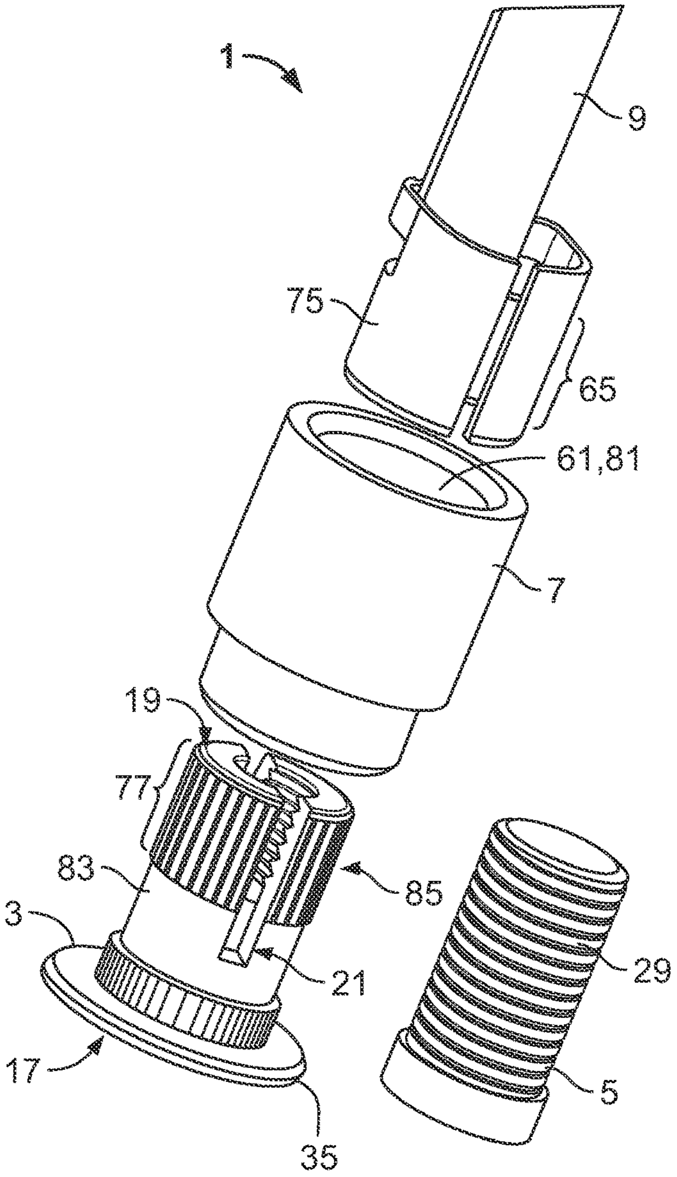
FIG. 5 is an exploded perspective view of a connection arrangement according to another embodiment.
Figure 6:
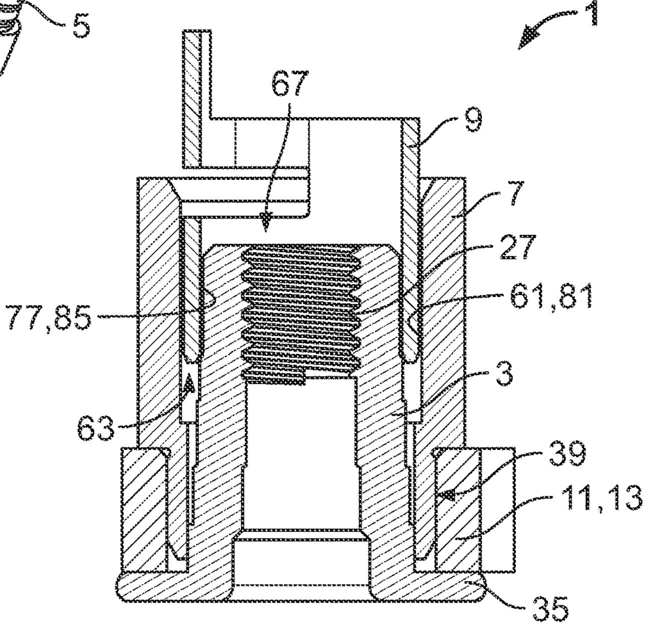
FIG. 6 is a sectional side view of the connection arrangement of FIG. 5.
Figure 7:
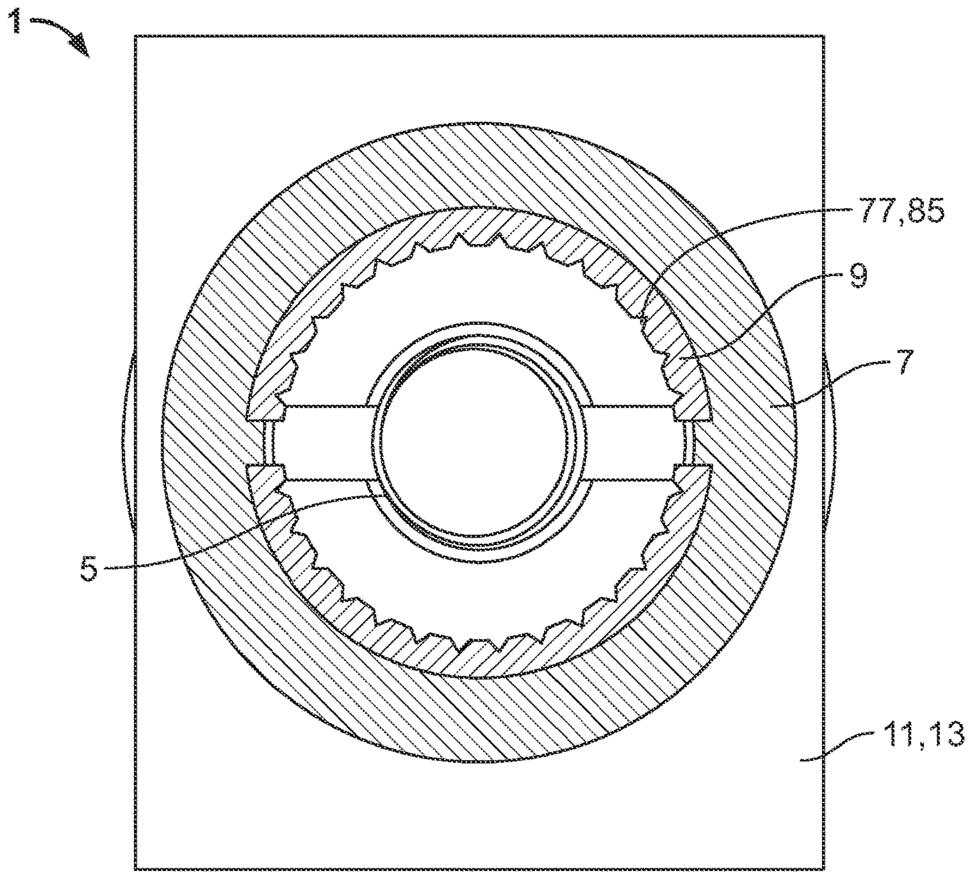
FIG. 7 is a sectional top view of the connection arrangement of FIG. 5.
Figure 8:
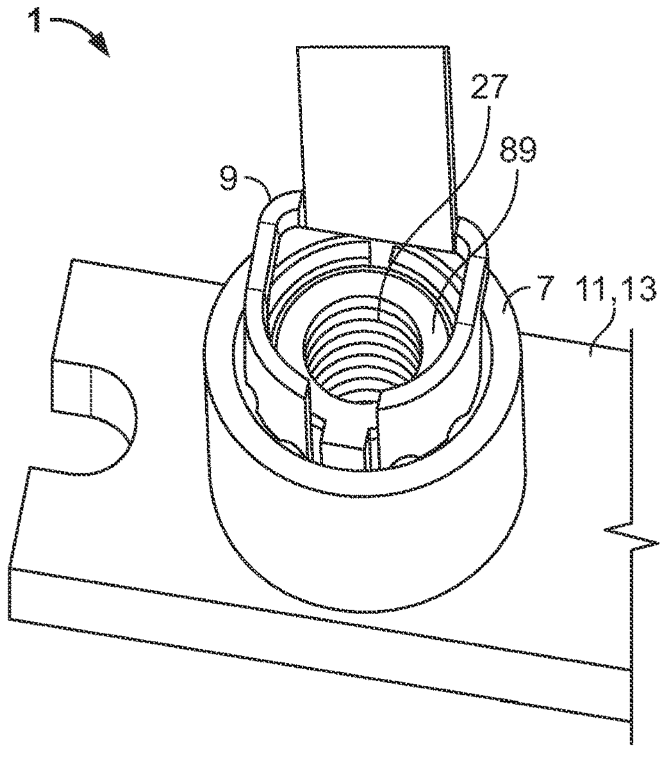
FIG. 8 is a perspective view of a connection arrangement according to another embodiment.

In the second embodiment, the expansion ferrule 3 is provided with a friction structure 77 on its outer surface 83 at least in the region in which it can be expanded as shown in FIGS. 5 to 7, i.e. at the level of the internal thread 27. The friction structure 77 extends from the contact-side end 19 toward the conductor-side end 17, but does not extend to the end of the longitudinal slots 21. The friction structure 77 is only required in the area where the expansion ferrule 3 is pressed against the contact element 9. Only by way of example, the friction structure 77 is shown as knurling 85. As an alternative to knurling 85, friction structure 77 may be formed as a plurality of contact projections 79 as in contact element 9 of the first embodiment or in any other structure.

The contact element 9 of the second embodiment is formed without a friction structure 77. Alternatively, the contact element 9 itself may be provided with a friction structure 77. In particular, the contact element 9 may be provided with a friction structure 77 on its outer surface 75. According to another alternative, the surface 81 of the inner wall 61 of the clamping contact ferrule 7 may be provided with a friction structure.

A third embodiment of a connection arrangement 1 according to the invention is shown in FIGS. 8 to 12. Again, for brevity, there are discussed only the differences from the previously described embodiments.

The third embodiment of the connection arrangement 1 differs from the formerly described embodiments in that it has a two-piece expansion ferrule 3. The expansion ferrule 3 may be used in the same manner as the expansion ferrule 3 of the formerly described embodiments. However, the manufacture of the two-piece expansion ferrule 3 may be simplified due to its two-piece nature. The two-piece expansion ferrule 3 is composed of a clamping element 87 and a receiving element 89. The receiving element 89 can be received in the clamping element 87. Once the receiving element 89 is inserted in the clamping element 87, the two-piece expansion ferrule 3 is assembled.

The clamping element 87 in the embodiment of FIGS. 8 to 12 has an external shape that is substantially the same as the shape of the expansion ferrule 3 of the formerly described embodiments. The clamping element 87 is not provided with an internal thread. An internal thread 27 of complementary design to the external thread 29 of the expansion element 5 is instead present inside the receiving element 89. The receiving element 89 thus has the expansion element receptacle 25.

The receiving element 89 is itself ferrule-shaped with a substantially hollow cylindrical shape. The receiving element 89 may be received within the clamping element 87, the clamping element 87 having a shoulder 91, shown in FIG. 11, extending along a circumferential direction of the clamping element 87 to define the position of the receiving element 89 with respect to the longitudinal axis 15. In other words, the shoulder 91 provides a seat for the receiving element 89.

To prevent rotation of the receiving element 89 when the expansion element 5 is actuated, the receiving element 89 can be received in the clamping element 87 in a rotation preventing manner. For this purpose, the clamping element 87 has a projection 95 on its outer side 93, which can be received in a complementarily shaped receptacle 97 in the clamping element 87.

Figure 11:
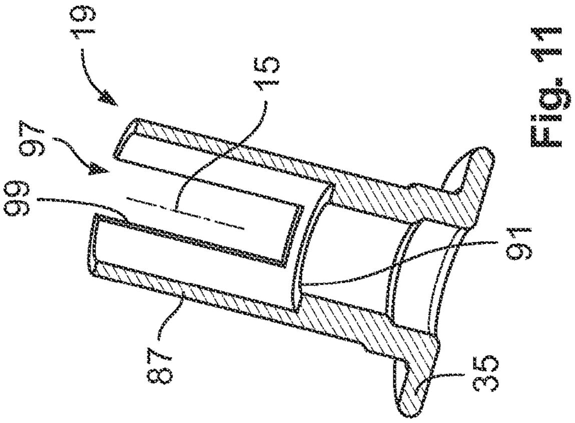
FIG. 11 is a sectional perspective view of a clamping element of the connection arrangement of FIG. 8.
Figure 12:
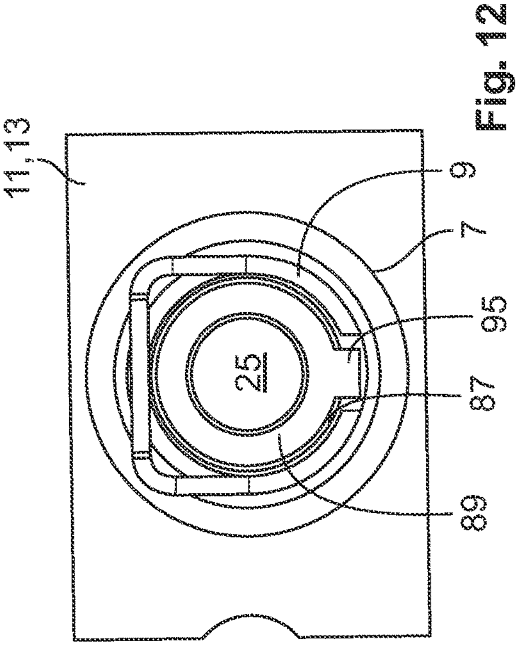
FIG. 12 is a sectional top view of the connection arrangement of FIG. 8.
Figure 9:
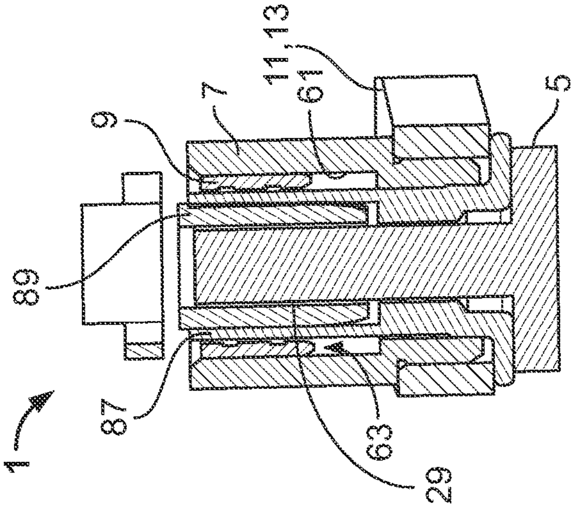
FIG. 9 is a sectional side view of the connection arrangement of FIG. 8.

In the fitted-together state of the two-piece expansion ferrule 3, the projection 95 projects radially into the receiving receptacle 97, shown in FIGS. 11 and 12. Since the projection 95 abuts an edge 99 bounding the receiving element 97 when the receiving element 89 is rotated, the receiving element 89 cannot rotate in the clamping element 87.

The projection 95 is shown merely by way of example as a rib extending along the longitudinal axis 15. The projection 95 may also have any other shape suitable to interact with the receiving receptacle 97 in such a way as to prevent rotation of the receiving element 89 in the clamping element 87.

Figure 10:
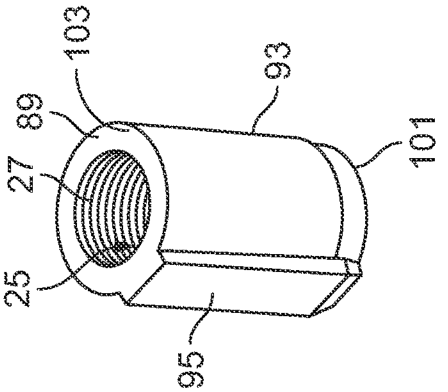
FIG. 10 is a perspective view of a receiving element of the connection arrangement of FIG. 8.

In order to facilitate the spreading of the two-piece expansion ferrule 3, the receiving element 89, shown in FIG. 10, may be conical at least in sections. For example, the receiving element 89 may have an increasing external cross-section from a bottom side 101, with which it may abut against the shoulder 91 in the fitted-together state, to a top side 103, which is opposite the bottom side along the longitudinal axis 15.

Alternatively, or in addition, the clamping element 87 may have an internal cross-section tapering from the contact-side end 19 toward the shoulder 91. Actuation of the expansion element 5 pulls the receiving element 89 into the clamping element 87, spreading the latter open. As a result, as in the formerly described embodiments, the electrical contact element 9 is pressed against the inner wall 61 of the clamping contact ferrule 7.

The connection arrangements according to the above embodiments both present a simple structure and offer the possibility of compensating for positional tolerances between the electrical contact element 9 and the electrical conductor 11.

What is claimed is:

1. A connection arrangement, comprising:

a conductor rail having a through hole;

an electrical contact element;

an expansion ferrule insertable in a slidable manner into a central opening of the electrical contact element;

a clamping contact ferrule receiving the expansion ferrule and the electrical contact element, the clamping contact ferrule has a conductor portion inserted into the through hole of the conductor rail and a contacting portion extending from the conductor portion and positioned above the conductor rail along a longitudinal axis; and an expansion element inserted into the expansion ferrule along the longitudinal axis, the electrical contact element is positioned in a contact receptacle defined between the expansion ferrule and the contacting portion of the clamping contact ferrule in a direction perpendicular to the longitudinal axis and is slidable in the contact receptacle with respect to the expansion ferrule and the clamping contact ferrule along the longitudinal axis, the expansion ferrule is expanded when the expansion element is fully inserted into the expansion ferrule to clamp the electrical contact element in the contact receptacle between the expansion ferrule and the clamping contact ferrule and fasten the electrical contact element to the conductor rail.

2. The connection arrangement of claim 1, wherein the expansion ferrule is expanded toward an inner wall of the clamping contact ferrule when the expansion element is fully inserted into the expansion ferrule.

3. The connection arrangement of claim 1, wherein the expansion element has a conical or wedge shape.

4. The connection arrangement of claim 1, wherein the expansion ferrule has an expansion element receptacle receiving the expansion element.

5. The connection arrangement of claim 4, wherein the expansion element receptacle tapers along an insertion direction of the expansion element.

6. The connection arrangement of claim 4, wherein the expansion ferrule is formed of two pieces and has a clamping element and a receiving element disposed in the clamping element, the receiving element has the expansion element receptacle.

7. The connection arrangement of claim 6, wherein the receiving element is held in the clamping element in a rotation preventing manner.

8. The connection arrangement of claim 1, wherein the expansion ferrule has an internal thread and the expansion element has an external thread complementary to the internal thread.

9. The connection arrangement of claim 1, wherein the electrical contact element has a contacting portion connected to the expansion ferrule.

10. The connection arrangement of claim 9, wherein the contacting portion of the electrical contact element abuts the expansion ferrule in a fitted-together state of the connection arrangement.

11. The connection arrangement of claim 10, wherein the contacting portion of the electrical contact element is substantially hollow cylindrical.

12. The connection arrangement of claim 2, wherein a surface of the expansion ferrule, the inner wall of the clamping contact ferrule, and/or a surface of the electrical contact element has a friction structure.

13. The connection arrangement of claim 12, wherein the surface of the electrical contact element has the friction structure at least in a contacting portion.

14. The connection arrangement of claim 1, wherein the expansion ferrule and/or the electrical contact element has a longitudinal slot.

15. The connection arrangement of claim 1, wherein the expansion ferrule is connected to the conductor rail projecting through the through hole and is inserted into the central opening of the electrical contact element.

16. The connection arrangement of claim 15, wherein the conductor portion of the clamping contact ferrule is inserted into the through hole from a first side of the conductor rail.

17. The connection arrangement of claim 16, wherein the expansion ferrule projects into the clamping contact ferrule and is inserted into the through hole from a second side of the conductor rail opposite the first side.

18. The connection arrangement of claim 15, wherein the expansion ferrule has a stop abutting against the conductor rail.

19. The connection arrangement of claim 17, wherein the clamping contact ferrule is positioned between the expansion ferrule and the conductor rail in the direction perpendicular to the longitudinal axis.

* * * * *